Sept. 2, 1958     G. W. EZELLE     2,850,248
REEL FOR PROCESSING FILM
Filed Feb. 29, 1956
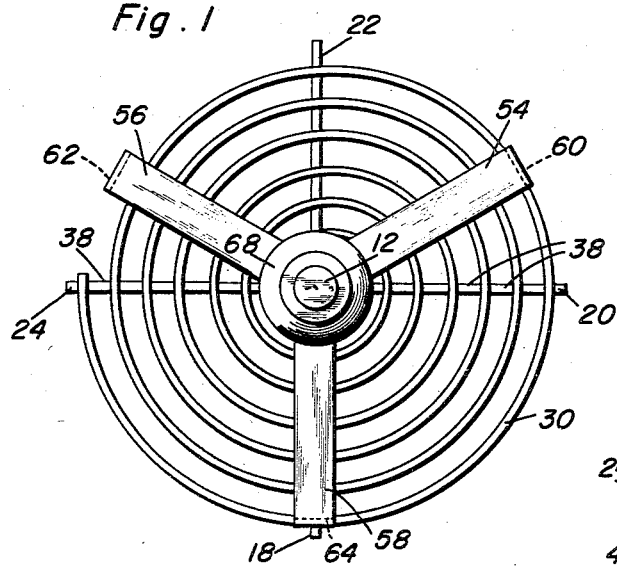
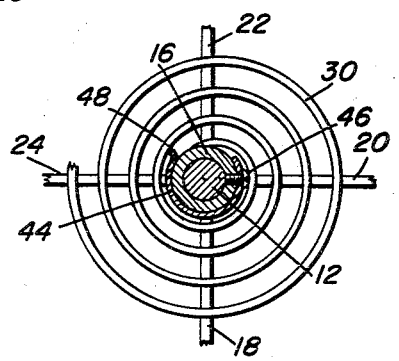
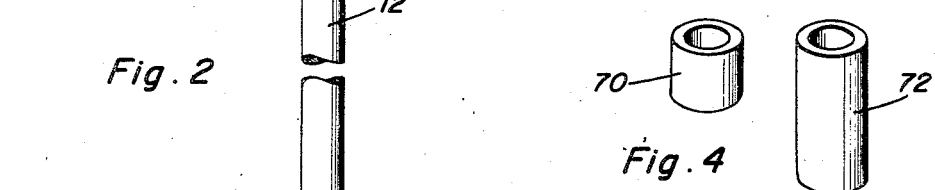
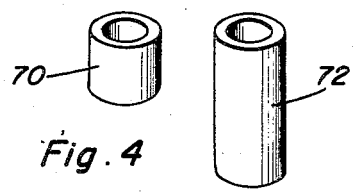
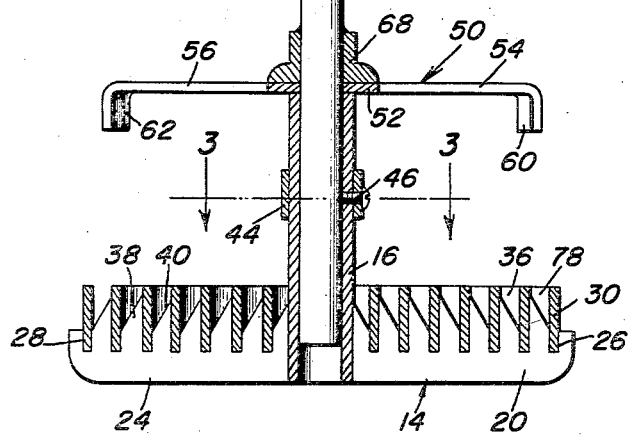
George W. Ezelle
INVENTOR.

United States Patent Office 2,850,248
Patented Sept. 2, 1958

2,850,248
REEL FOR PROCESSING FILM
George W. Ezelle, Santa Ana, Calif.
Application February 29, 1956, Serial No. 568,580
3 Claims. (Cl. 242—77.1)

This invention relates to improvements in film holding reels for processing, and developing or fixing or washing film during the usual operations performed thereon both by the profressional and hobbyist.

An object of the present invention is to provide a device with which the handling of film becomes easier and safer from a damage standpoint to the film.

A further object of the invention is to provide such a reel which is inexpensive, light in weight and mechanically simple.

A further object of the invention is to provide a reel on which the film may be wound by holding the spindle of the reel in one hand and rotating that spindle, the rotary movement being imparted to a film support that has a spiral wall in which the film is wound after being guided by an arm of a spider that is rotatably disposed on the spindle, the film being passed between two fingers of the other hand of the person using the device and over one of the arms of the spider. After the film is so wound on the support the spider functions as a clamp to hold the film firmly in the support.

A further object of the invention is to provide a film holding reel that is primarily useful in the processing of film, this reel having means in the support for the film which constantly urge the film against a surface of the support with the emulsion side of the film facing away from the wall in order to prevent possible damage to the film while handling during the winding on the reel and during the processing of the film.

Another object of the invention is to provide a reel of the type described wherein by a very practical method the means for holding the film firmly in place on the reel support are adjustable so that 8, 16, or 35 millimeter film may be accommodated.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a plan view of a typical film reel that is made in accordance with the principles of the invention;

Figure 2 is an elevational view of the reel in Figure 1 with parts being shown in section;

Figure 3 is a fragmentary sectional view taken on the line 3—3 of Figure 2;

Figure 4 is a perspective view of a collar that is useful in enlarging the capacity of the reel so as to accommodate a wider film; and Figure 5 is a perspective view of another collar to further enlarge the width capacity of the reel.

A film holding reel that is made in accordance with the principles of the invention is illustrated in the drawing. It consists of a spindle 12 that is of a convenient length to be held in one hand. A film holding support 14 is mounted on one end of the spindle 12, this support being adapted to accommodate strip film, as motion picture film. This support consists of a sleeve 16 in whose bore one end of spindle 12 is mounted. Support members, as plates 18, 20, 22 and 24 are fixed at their inner ends to sleeve 16 and protrude radially therefrom. The upper surface of each plate has a series of upwardly opening notches, for example the series 26 of notches in plate 20 and the series 28 of notches in plate 24. A continuous wall 30 has its lower portion located in these notches, the walls being shaped in the form of a spiral with the inner end thereof clamped tightly against the outer surface of sleeve 16 (Figure 3). The inner surface 36 of each convolution of the spiral wire forms a seat against which the film is adapted to rest. The emulsion side of the film is directed away from surface 36 so that it is not abraded by this surface. Means are provided for constantly urging the film against the surface 36. The preferred means comprise a plurality of inclined members 38 that are located between each of the notches. They assume the configuration of teeth with inclined faces 40 which slope downwardly toward the bottom of the notch with which they are associated. Therefore, the surfaces 40 form an inclined plane which tends to hold the film on the bottom thereof which would be with the non-emulsion side of the film against surface 36 of the convoluted wall 30.

A curved spring 44 is anchored, as by a screw 46 near one end of the sleeve 16. This same screw functions as a set screw to hold the sleeve on the spindle 12. The opposite end of spring 44 has a finger grip and cam that guides the film end between the spring 44 and the surface of sleeve 16.

Spider 50 is mounted for rotation on spindle 12 and includes a hub 52 from which radial arms 54, 56 and 58 protrude. The ends of these arms have lateral extensions 60, 62 and 64 projecting at right angles therefrom and directed toward the support 14. A stop 68 in the form of a collar fixed to spindle 12 abuts hub 52 and prevents the collar from sliding axially on the spindle 12 while permitting it to rotate. The inner end of sleeve 16 serves an identical function. The spider serves as a clamp to hold the film in support 14 after it is placed therein. Therefore the distance between the spider and the support 14 is variable in accordance with the width of film that is being stored on the support. Variation in this distance is obtained by placing one or more collars on the spindle 12 between sleeve 16 and hub 52 of spider 50. For example collar 70 may be used for this purpose or a longer collar 72 used when a wider film is being processed.

In use spindle 12 is grasped in one hand. The end of the film is slipped under spring 44 and pushed into the beginning of the spiral groove 78 which is defined by the opposite surfaces of the convolutions of wall 30. One arm, for example arm 54, of the spider is held between the thumb and forefinger of the other hand and the film is passed loosely between the ring and middle fingers of the same hand at an angle that allows the film to enter the groove. The film goes under the next arm, for example arm 56 which straightens it up and keeps it in the groove 78. Now, by turning the spindle with the fingers of the hand in which the spindle is located, support 14 revolves and the film is fed into and will wind into the spiral groove 78 of the support. Since the spacing between the spider 50 and the support 15 is such that the film fits between the bottom of groove 78 and the undersurface of the spider arms 54, 56 and 58, the lateral extension 60, 62 and 64 function to hold the film assembled in the groove by contact with the outer convolution thereof. The inclined surfaces 40 of the inclined members 38 keep the film with its emulsion side spaced from the surfaces of the wall 30.

For removing the film it is necessary only to reverse turn turning of the reel and the film is paid out from support 14. There are many factors which are taken into consideration in the construction of the reel. It provides for a maximum of exposure to light in the second exposure that is necessary for the processing of "Ektacrome" color and other reversal films which are presently available for amateur use with developing kits. The emulsion of the color films are more delicate than other films when wet. The film may remain on the reel until processing is complete. In this way a measure of protection against damage is realized.

By virtue of the described construction it is possible to make the reel small in size. In addition the device may be made from plastic or other inexpensive materials with the more expensive models made of stainless steel or like materials. At the present time developers are sold which make approximately a pint of solution. The solutions are mixed in jars and remain there at all time which extends throughout the life of the solutions as they are exposed to the air a short length of time. Accordingly with this reel it is possible to move from one jar to the other, recapping the jar as the processing continues. There can be no mistakes or tanks to wash after the last one full of solution is left as far as the developing process is concerned. The convenient spindle functions as a handle for these purposes and makes it necessary that the film be immersed and removed properly, otherwise the top on the jar will not fit (if the reel is not removed).

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A reel for processing strip film, said reel comprising a spindle, a spider mounted on said spindle and having a central collar with an aperture through which said spindle is passed together with a plurality of radially protruding arms extending from said collar, said arms having downturned ends and at least a part of said arms constituting a film guide, a sleeve disposed on said spindle, a plurality of radially protruding flat plates extending from said sleeve, each of said flat plates having a plurality of upwardly opening notches, a continuous spiral wall forming a spiral groove disposed in said notches of said flat plates and rising upwardly therefrom, one side wall of each notch being upwardly and outwardly inclined with respect to said continuous wall in order to form a cam surface against which the lower edge of the film is adapted to bear thereby tending to slide the film toward said spiral wall, and means on said sleeve for holding an end of the film while said spindle is rotated in order to wind the film in said spiral groove with said inclined walls of said notches automatically guiding the film toward said spiral wall.

2. The reel of claim 1 wherein said means on said sleeve for holding an end of the film while said spindle is rotated comprising a spring anchored adjacent to one end to said sleeve and having a surface located in close proximity to said sleeve to grip the film between said surface and the sleeve.

3. A reel for processing strip film, said reel comprising a spindle, a spider mounted on said spindle and having a plurality of radially protruding arms, downturned ends on said arms and at least a part of said arms constituting a film guide, a sleeve disposed on said spindle and in longitudinal alignment with said spider, a plurality of radially protruding members extending from said sleeve and opposing said arms of said spider and in spaced relationship to said arms of said spider, each of said members having a plurality of upwardly opening notches, a continuous spiral wall forming a spiral groove and disposed in said notches and rising therefrom and having edges which confront said arms of said spider, one side wall of each notch being inclined with respect to said continuous wall to form a cam surface against which one edge of the film is adapted to bear thereby tending to slide the film toward said spiral wall, and means on said sleeve for holding an end of the film while said spindle is rotated in order to wind the film in said spiral groove with said inclined walls of said notches automatically guiding the film toward said spiral wall.

References Cited in the file of this patent

UNITED STATES PATENTS

| 1,934,245 | Stineman | Nov. 7, 1933 |
| 2,112,605 | Pless | Mar. 29, 1938 |
| 2,112,606 | Pless | Mar. 29, 1938 |
| 2,351,396 | Broms | June 13, 1944 |
| 2,539,884 | Barth | Jan. 30, 1951 |

FOREIGN PATENTS

| 261,947 | Germany | Sept. 10, 1911 |
| 598,632 | Great Britain | Feb. 23, 1948 |